United States Patent
Bagchi et al.

(10) Patent No.: US 12,250,284 B2
(45) Date of Patent: Mar. 11, 2025

(54) MESSAGE MANAGEMENT VIA A UNIVERSAL INTERFACE APPARATUS

(71) Applicant: International Business Machines Corporation, Armonk, NY (US)

(72) Inventors: Debajyoti Bagchi, Kolkata (IN); Shantanu Sinha, Kolkata (IN); Sandip Gajanan Andhale, Rockville, MD (US); Subodh Agarwal, Gaithersburg, MD (US); Arijit Mukherjee, Balurghat (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/459,800

(22) Filed: Aug. 27, 2021

(65) Prior Publication Data
US 2023/0065780 A1    Mar. 2, 2023

(51) Int. Cl.
*H04L 67/565* (2022.01)
*H04L 51/066* (2022.01)
*H04L 67/00* (2022.01)
*H04L 69/08* (2022.01)

(52) U.S. Cl.
CPC .......... *H04L 67/565* (2022.05); *H04L 51/066* (2013.01); *H04L 67/34* (2013.01); *H04L 69/08* (2013.01)

(58) Field of Classification Search
CPC ..... H04L 67/565; H04L 51/066; H04L 67/34; H04L 69/08
See application file for complete search history.

(56) References Cited

U.S. PATENT DOCUMENTS

| 4,431,864 A * | 2/1984 | Sturdevant, Jr. ........ H04L 12/02 178/17.5 |
| 5,185,736 A * | 2/1993 | Tyrrell .................. H04J 3/1611 370/359 |

(Continued)

OTHER PUBLICATIONS

Rockwell Automation. (2003). Serial Converter Module User Manual. Retrieved from https://literature.rockwellautomation.com/idc/groups/literature/documents/um/22comm-um002_-en-p.pdf.*

(Continued)

*Primary Examiner* — Boris D Grijalva Lobos
*Assistant Examiner* — Timothy Sowa
(74) *Attorney, Agent, or Firm* — Aaron N. Pontikos

(57) ABSTRACT

Techniques are described with respect to managing a distributed device message in a computing infrastructure. Such techniques are enabled through a universal interface apparatus including a plurality of serial interface adapter boards and a system-on-a-chip microcontroller. The universal interface apparatus provides a universal gateway solution between one or more component interfaces associated with a certain premises or environment and a remote system. An associated method includes deriving core message content from a distributed device message originating from a source component in a computing infrastructure, converting the derived core message content to open standard file format message content, propagating the open standard file format message content to a virtualized management system, and receiving an open standard file format message response from the virtualized management system.

20 Claims, 8 Drawing Sheets

(56) References Cited

U.S. PATENT DOCUMENTS

| | | | | |
|---|---|---|---|---|
| 5,457,784 | A * | 10/1995 | Wells | G06F 13/385 |
| | | | | 708/174 |
| 9,739,834 | B1 * | 8/2017 | Azimi | G01R 31/3177 |
| 10,841,121 | B1 | 11/2020 | Scoggins et al. | |
| 2005/0021874 | A1 * | 1/2005 | Georgiou | G06F 15/167 |
| | | | | 709/250 |
| 2005/0144137 | A1 * | 6/2005 | Kumar | H04L 67/02 |
| | | | | 705/55 |
| 2008/0005586 | A1 * | 1/2008 | Munguia | H04N 21/4367 |
| | | | | 348/E7.056 |
| 2009/0059955 | A1 * | 3/2009 | Georgiou | G06F 15/7842 |
| | | | | 370/466 |
| 2015/0103822 | A1 * | 4/2015 | Gianchandani | H04L 69/08 |
| | | | | 370/389 |
| 2016/0170795 | A1 * | 6/2016 | Sanghvi | H04L 41/06 |
| | | | | 718/1 |
| 2016/0373558 | A1 | 12/2016 | Peng et al. | |
| 2017/0103076 | A1 * | 4/2017 | Bhattacharya | G06F 16/283 |
| 2017/0324606 | A1 * | 11/2017 | Hobbs | H04L 63/30 |
| 2018/0167516 | A1 | 6/2018 | Warrick | |
| 2018/0176862 | A1 * | 6/2018 | Malas | H04L 69/08 |
| 2018/0225230 | A1 * | 8/2018 | Litichever | G06F 21/82 |
| 2018/0373607 | A1 * | 12/2018 | Kuehnis | G06F 11/24 |
| 2019/0373081 | A1 * | 12/2019 | Jung | H04L 67/125 |
| 2021/0029225 | A1 * | 1/2021 | Laurenti | H04L 69/08 |
| 2021/0176326 | A1 * | 6/2021 | Carley | G06F 9/546 |
| 2022/0365900 | A1 * | 11/2022 | Kolor | G06F 9/546 |
| 2022/0368627 | A1 * | 11/2022 | Stephens, Jr. | H04L 45/42 |

OTHER PUBLICATIONS

Azzola, Francesco. Implement Arduino REST API in IoT Projects. DZone, May 25, 2016. [9 printed pages] <https://dzone.com/articles/implement-arduino-rest-api-in-iot-projects>.

ArduinoJson Version 6 Examples. ArduinoJson, Accessed Jun. 2, 2021. [4 printed pages] <https://arduinojson.org/v6/example/>.

Network Serial Port Kit. FabulaTech.com, Accessed Jun. 2, 2021. [5 printed pages] <https://www.fabulatech.com/network-serial-port-kit.html>.

* cited by examiner

MESSAGE MANAGEMENT VIA A UNIVERSAL INTERFACE APPARATUS

BACKGROUND

The various embodiments described herein generally relate to message management. More specifically, the various embodiments describe techniques of managing a distributed device message via a universal interface apparatus.

SUMMARY

The various embodiments described herein provide message processing techniques. According to one or more embodiments, an associated computer-implemented method of message management via a system-on-a-chip microcontroller of a universal interface apparatus includes deriving core message content from a distributed device message originating from a source component in a computing infrastructure, converting the derived core message content to open standard file format message content, propagating the open standard file format message content to a virtualized management system, and receiving an open standard file format message response from the virtualized management system. In an embodiment, the computer-implemented method includes adapting the open standard file format message response to a distributed message response for relay to the source component. In an additional embodiment, the computer-implemented method includes receiving at least one over-the-air (OTA) firmware or configuration update.

One or more additional embodiments pertain to a computer program product for managing a distributed device message via a universal interface apparatus, the computer program product including a computer readable storage medium having program instructions embodied therewith. According to such additional embodiment(s), the program instructions may be executable by at least one processor core in a system-on-a-chip microcontroller of the universal interface apparatus to cause the at least one processor core to perform one or more steps of the above recited method.

One or more further embodiments pertain to a universal interface apparatus. The universal interface apparatus includes a system-on-a-chip microcontroller configured to derive core message content from a distributed device message originating from a source component in a computing infrastructure, convert the derived core message content to open standard file format message content, propagate the open standard file format message content to a virtualized management system, and receive an open standard file format message response from the virtualized management system. In an embodiment, the system-on-a-chip microcontroller is configured to adapt the open standard file format message response to a distributed message response for relay to the source component. In an additional embodiment, the system-on-a-chip microcontroller is configured to receive at least one OTA firmware or configuration update. The universal interface apparatus further includes a plurality of serial interface adapter boards configured to convert any serial aspect of the distributed device message to TTL format to facilitate derivation of the core message content. In an embodiment, the plurality of serial interface adapter boards include a D-subminiature connector variety to RS-232 adapter board configured to convert a D-subminiature connector variety format associated with the distributed device message to RS-232 format and an RS-232 to TTL adapter board configured to convert the RS-232 format to the TTL format. In a related embodiment, the D-subminiature connector variety to RS-232 adapter board is a DB-25 to RS-232 adapter board. In an alternative related embodiment, the D-subminiature connector variety to RS-232 adapter board is a DB-9 to RS-232 adapter board.

BRIEF DESCRIPTION OF THE DRAWINGS

So that the manner in which the above recited aspects are attained and can be understood in detail, a more particular description of embodiments, briefly summarized above, may be had by reference to the appended drawings.

Note, however, that the appended drawings illustrate only typical embodiments of this invention and are therefore not to be considered limiting of its scope, for the invention may admit to other equally effective embodiments.

DETAILED DESCRIPTION

Figure 1:
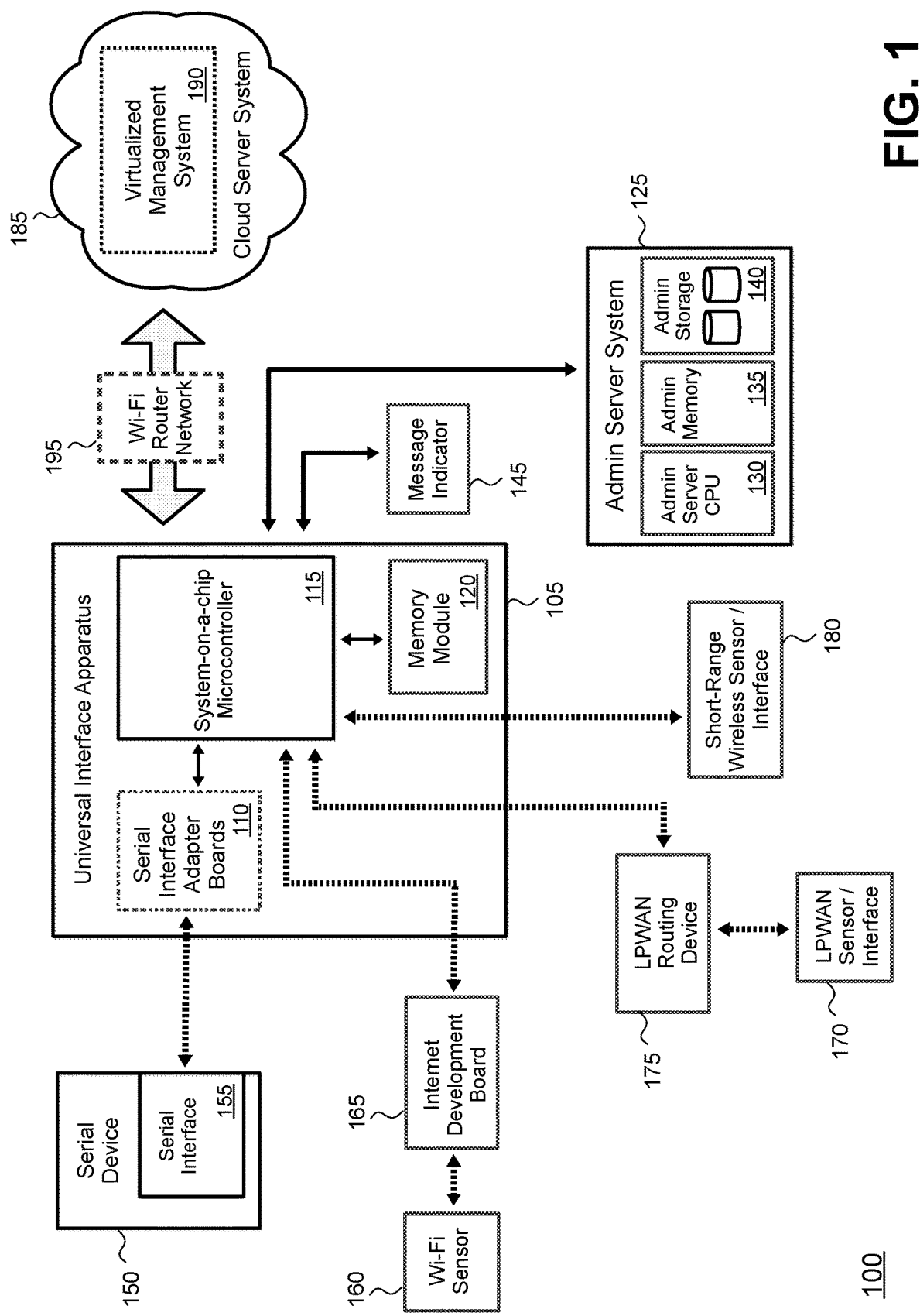
FIG. 1 illustrates a computing infrastructure, according to one or more embodiments.

The various embodiments described herein are directed to techniques of managing a distributed device message. The various embodiments are described from the purview of a universal interface apparatus including a system-on-a-chip microcontroller and a plurality of serial interface adapter boards. The universal interface apparatus is in a computing infrastructure associated with a certain environment or premises requiring distributed network connectivity (e.g., a hotel or other premises). The computing infrastructure includes a plurality of distributed devices. In an embodiment, the plurality of distributed devices include serial device(s). Additionally or alternatively, the plurality of distributed devices include IoT wireless device(s), including Wi-Fi compatible IoT sensors(s), low-power wide area network (LPWAN) compatible IoT sensor(s) or device interface(s), and/or short-range wireless compatible IoT sensor(s) or device interface(s).

The universal interface apparatus is configured to interface with particular group(s) of serial devices and/or wireless devices. In an embodiment, the universal interface apparatus is configured to interface with multiple device types, i.e., multiple types of serial devices and/or wireless devices. For instance, the universal interface apparatus optionally is configured to interface with a group of fifty serial interface locks and ten Wi-Fi compatible interface locks. In an alternative embodiment, the universal interface apparatus is configured to interface with only a single device type, i.e., only a single serial device type and/or only a single wireless device type. For instance, the universal interface apparatus optionally is configured to interface with a group of twenty Wi-Fi compatible interface locks only. According to both embodiments, a computing infrastructure associated with a certain environment or premises optionally includes multiple universal interface apparatuses within a given premises or environment to ensure sufficient network coverage of all distributed devices.

The various embodiments described herein may have advantages over conventional techniques. The various embodiments improve computer technology by providing a universal gateway solution between one or more component interfaces associated with a certain premises or environment and a remote, e.g., cloud-based, system. Accordingly, the various embodiments standardize interface communication between a certain premises or environment and one or more remote systems. Furthermore, the various embodiments are configured to support both legacy (e.g., serial) components and wireless IoT components. In particular, the various embodiments enable both legacy components and wireless IoT components to interface with modern cloud-based internet solutions. Additionally, the various embodiments enable over-the-air (OTA) firmware update and configuration. Moreover, the various embodiments provide a compact, low-powered universal interface component that optionally is battery operated. Some of the various embodiments may not include all such advantages, and such advantages are not necessarily required of all of the various embodiments.

In the following, reference is made to various embodiments of the invention. However, it should be understood that the invention is not limited to specific described embodiments. Instead, any combination of the following features and elements, whether related to different embodiments or not, is contemplated to implement and practice the invention. Furthermore, although embodiments may achieve advantages over other possible solutions and/or over the prior art, whether or not a particular advantage is achieved by a given embodiment is not limiting. Thus, the following aspects, features, embodiments, and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions also may be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions also may be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Particular embodiments describe techniques relating to distributed device message processing. However, it is to be understood that the techniques described herein may be adapted to a variety of purposes in addition to those specifically described herein. Accordingly, references to specific embodiments are included to be illustrative and not limiting.

FIG. 1 illustrates a computing infrastructure 100, according to one or more embodiments. Computing infrastructure 100 includes various aspects associated with a certain premises or environment (e.g., a hospitality premises such as a hotel). As shown, computing infrastructure 100 includes a hardware-based universal interface apparatus 105 associated with the certain premises or environment. Although shown as a single component, universal interface apparatus 105 is included to be representative of a single universal interface apparatus or multiple respective universal interface apparatuses. Universal interface apparatus 105 is a plug and play (PnP) device configured to automatically facilitate discovery of other components within computing infrastructure 100. Universal interface apparatus 105 enables a set of respective serial devices and/or respective IoT wireless devices in computing infrastructure 100 to communicate with cloud resources via a single unified interface. Universal interface apparatus 105 includes serial interface adapter boards 110, a system-on-a-chip microcontroller 115, and at least one memory module 120. Serial interface adapter boards 110 optionally include an adapter board configured to convert a D-subminiature connector variety format (e.g., DB-25 or DB-9) to RS-232 format. In an embodiment, such adapter board is a DB-25 to RS-232 adapter board. In an alternative embodiment, such adapter board is a DB-9 to RS-232 adapter board. Furthermore, serial interface adapter boards 110 optionally include an adapter board configured to RS-232 format to transistor-translator logic (TTL) format, i.e., an RS-232 to TTL adapter board.

System-on-a-chip microcontroller 115 is configured to interface with serial device(s) via serial interface adapter boards 110. System-on-a-chip microcontroller 115 further is configured to interface with wireless device(s), e.g., Wi-Fi compatible device(s), LPWAN compatible device(s) such as Long Range wide area network (LoRaWAN®) compatible device(s), and/or a short-range wireless compatible device such as a Bluetooth® device. System-on-a-chip microcontroller 115 includes at least one processor core and at least one memory component. One or more cores of the at least one processor core in system-on-a-chip microcontroller 115 execute method steps pertaining to distributed device message management in accordance with the various embodiments described herein. In an embodiment, system-on-a-chip microcontroller 115 is a dual core microcontroller, i.e., including two processor cores. The at least one memory module 120 includes at least one hardware-based storage component configured to store write log information, e.g., a micro TransFlash (TF) or secure digital (SD) card memory shield module. System-on-a-chip microcontroller 115 includes, or is operatively coupled to, software-based applications configured to execute steps and/or techniques associated with the various embodiments described herein via serial interface adapter boards 110 and/or system-on-a-chip microcontroller 115.

Computing infrastructure 100 as illustrated includes an administrative server system 125 associated with the certain premises or environment. Administrative server system 125 includes, or is operatively coupled to, a single server or a plurality of hardware and/or virtualized servers configured to provide hosting and/or data storage capabilities. Administrative server system 125 includes an administrative server CPU 130, an administrative memory 135, and administrative storage 140. Administrative server CPU 130 is included to be representative of a single CPU, multiple CPUs, a single CPU having multiple processing cores, and the like. Administrative memory 135 includes, or is operatively coupled to, at least one server application configured to communicate with administrative server CPU 130, administrative storage 140, and external components. Administrative memory 135 includes or is operatively coupled to a database management system (DBMS), which is representative of a single database system or multiple database systems. Administrative storage 140 includes or is operatively coupled to server databases and server application data. The DBMS associated with administrative memory 135 includes or interfaces with at least one database application configured to manage the server databases associated with administrative storage 140. In an embodiment, the at least one server application sends database requests to the DBMS associated with administrative memory 135 and processes results returned by the DBMS. In an additional embodiment, the server databases associated with administrative storage 140 include one or more relational databases. In a further embodiment, the server databases associated with administrative storage 140 include one or more ontology trees or other ontological structures.

Computing infrastructure 100 as illustrated includes at least one message indicator 145 associated with universal interface apparatus 105. The at least one message indicator 145 is configured to display or present a manifestation or notification associated with a message processed by universal interface apparatus 105, e.g., a message acknowledgment/non-acknowledgment manifestation or notification. The at least one message indicator 145 optionally includes a light-emitting diode (LED) and/or a liquid-crystal display (LCD) screen.

Computing infrastructure 100 as illustrated includes a serial device 150 associated with the certain premises or environment, e.g., located within or located within a predetermined proximity to the certain premises or environment. Serial device 150 has a respective serial interface 155 configured to communicate with external components, e.g., one or more of serial interface adapter boards 110 of universal interface apparatus 105. Serial device 150 is representative of a single serial device or multiple serial devices. In an embodiment, serial device 150 (more specifically serial interface 155) is configured to connect to a serial interface adapter board among serial interface adapter boards 110 of universal interface apparatus 105 via at least one serial cable.

Computing infrastructure 100 as illustrated includes a Wi-Fi compatible IoT sensor 160 associated with the certain premises or environment, e.g., located within, or located within a predetermined proximity to, the certain premises or environment. Wi-Fi compatible IoT sensor 160 is representative of a single Wi-Fi compatible IoT sensor or multiple Wi-Fi compatible IoT sensors. In an embodiment, Wi-Fi compatible IoT sensor 160 is a digital sensor and/or incorporates digital sensor capabilities. In an additional embodiment, Wi-Fi compatible IoT sensor 160 is an analog sensor and/or incorporates analog sensor capabilities. In a further embodiment, Wi-Fi compatible IoT sensor 160 incorporates both analog sensor and digital sensor capabilities. In a further embodiment, Wi-Fi compatible IoT sensor 160 is an environmental sensor and/or incorporates environmental sensor capabilities. According to such embodiment, Wi-Fi compatible IoT sensor 160 measures one or more environmental factors. For instance, Wi-Fi compatible IoT sensor 160 optionally is a room temperature and/or humidity sensor configured to measure room temperature and/or humidity. Additionally or alternatively, according to such embodiment, Wi-Fi compatible IoT sensor 160 measures one or more security factors. For instance, Wi-Fi compatible IoT sensor 160 optionally is a motion sensor configured to detect third party movement within a certain sensor range and/or at a designated premises location, e.g., near or within a particular building space. In another instance, Wi-Fi compatible IoT sensor 160 is a thermal sensor configured to detect third party presence based upon body temperature within a certain sensor range and/or at a designated premises location. Wi-Fi compatible IoT sensor 160 is configured to communicate with at least one internet development board 165. The at least one internet development board 165 is configured to send application programming interface (API) calls to system-on-a-chip microcontroller 115 of universal interface apparatus 105. In a further embodiment, the at least one internet development board 165 is configured to communicate with a Wi-Fi compatible IoT device interface in addition to or in lieu of Wi-Fi compatible IoT sensor 160.

Computing infrastructure 100 as illustrated includes an LPWAN compatible IoT sensor or device interface 170 associated with the certain premises or environment, e.g., located within, or located within a predetermined proximity to, the certain premises or environment. LPWAN compatible IoT sensor or device interface 170 is representative of a single LPWAN compatible IoT sensor or device interface or multiple LPWAN compatible IoT sensors and/or device interfaces. In an embodiment, LPWAN compatible IoT sensor or device interface 170 is a digital sensor and/or incorporates digital sensor capabilities. In an additional embodiment, LPWAN compatible IoT sensor or device interface 170 is an analog sensor and/or incorporates analog sensor capabilities. In a further embodiment, LPWAN compatible IoT sensor or device interface 170 incorporates both analog sensor and digital sensor capabilities. In a further embodiment, LPWAN compatible IoT sensor or device interface 170 is an environmental sensor and/or incorporates environmental sensor capabilities. According to such embodiment, LPWAN compatible IoT sensor or device interface 170 measures one or more environmental factors. For instance, LPWAN compatible IoT sensor or device interface 170 optionally is a temperature and/or humidity sensor configured to measure temperature and/or humidity at a designated premises location, e.g., in a premises parking lot. Additionally or alternatively, according to such embodiment, LPWAN compatible IoT sensor or device interface 170 measures one or more security factors. For instance, LPWAN compatible IoT sensor or device interface 170 optionally is a motion sensor configured to detect third party movement within a certain sensor range and/or at a designated premises location. In another instance, LPWAN compatible IoT sensor or device interface 170 is a thermal sensor configured to detect third party presence based upon body temperature within a certain sensor range and/or at a designated premises location.

In an embodiment, LPWAN compatible IoT sensor or device interface 170 functions as an interface to enable and/or enhance LPWAN capabilities of a device associated with the certain premises or environment, e.g., a premises parking device. LPWAN compatible IoT sensor or device interface 170 is configured to communicate with at least one LPWAN routing device 175. The at least one LPWAN routing device 175 is configured to send API calls to system-on-a-chip microcontroller 115 of universal interface apparatus 105. Each of the at least one LPWAN routing device 175 optionally is configured to function as direct link between LPWAN compatible IoT sensor or device interface 170 and system-on-a-chip microcontroller 115 of universal interface apparatus 105. Additionally or alternatively, each of the at least one LPWAN routing device 175 optionally is configured to function as an intermediate link (e.g., as a repeater device) between LPWAN compatible IoT sensor or device interface 170 and system-on-a-chip microcontroller 115 of universal interface apparatus 105.

Computing infrastructure 100 as illustrated includes short-range wireless compatible IoT sensor or device interface 180 associated with the certain premises or environment, e.g., located within, or located within a predetermined proximity to, the certain premises or environment. Short-range wireless compatible IoT sensor or device interface 180 is representative of a single short-range wireless compatible IoT sensor or device interface or multiple short-range wireless compatible IoT sensors and/or device interfaces. In an embodiment, short-range wireless compatible IoT sensor or device interface 180 is a digital sensor and/or incorporates digital sensor capabilities. In an additional embodiment, short-range wireless compatible IoT sensor or device interface 180 is an analog sensor and/or incorporates analog sensor capabilities. In a further embodiment, short-range wireless compatible IoT sensor or device interface 180 incorporates both analog sensor and digital sensor capabilities. In a further embodiment, short-range wireless compatible IoT sensor or device interface 180 is an environmental sensor and/or incorporates environmental sensor capabilities. According to such embodiment, short-range wireless compatible IoT sensor or device interface 180 measures one or more environmental factors. For instance, short-range wireless compatible IoT sensor or device interface 180 optionally is a temperature and/or humidity sensor configured to measure temperature and/or humidity at a designated premises location, e.g., within a central security-sensitive control room. Additionally or alternatively, according to such embodiment, short-range wireless compatible IoT sensor or device interface 180 measures one or more security factors. For instance, short-range wireless compatible IoT sensor or device interface 180 optionally is a motion sensor configured to detect third party movement within a certain sensor range and/or at a designated premises location, e.g., a central security-sensitive control room. In another instance, short-range wireless compatible IoT sensor or device interface 180 is a thermal sensor configured to detect third party presence based upon body temperature within a certain sensor range and/or at a designated premises location. In an embodiment, short-range wireless compatible IoT sensor or device interface 180 functions as an interface to enable and/or enhance short-range wireless capabilities of a device associated with the certain premises or environment, e.g., a central security-sensitive control room device. Short-range wireless compatible sensor or device interface 180 is configured to communicate with system-on-a-chip microcontroller 115 of universal interface apparatus 105.

As illustrated in FIG. 1, universal interface apparatus 105 is configured to interface with both a serial component and multiple wireless IoT components. According to one or more alternative embodiments, computing infrastructure 100 only includes a subset of the components previously described. For instance, in one alternative embodiment, computing infrastructure 100 incorporates a serial component only, without any wireless IoT component. In another alternative embodiment, computing infrastructure 100 incorporates only one or more wireless IoT components, without any serial component. In a further alternative embodiment, universal interface apparatus 105 is configured to communicate with a single serial component interface type (e.g., a PBX serial interface type) or a single wireless IoT component interface type (e.g., a Wi-Fi IoT interface type). According to one or more of such alternative embodiments, computing infrastructure 100 optionally includes multiple universal interface apparatuses, each configured to communicate with a respective serial component type or a respective wireless IoT component interface type.

Additional alternative embodiments of computing infrastructure 100 include different combinations of wireless IoT components. In an alternative embodiment, computing infrastructure 100 includes only one or more of Wi-Fi compatible IoT sensor 160 and one or more of LPWAN compatible IoT sensor or device interface 170 without short-range wireless compatible sensor or device interface 180. In another alternative embodiment, computing infrastructure includes only one or more of Wi-Fi compatible IoT sensor 160 and one or more of short-range wireless compatible sensor or device interface 180 without LPWAN compatible IoT sensor or device interface 170. In another alternative embodiment, computing infrastructure includes only one or more of Wi-Fi compatible IoT sensor 160 without LPWAN compatible IoT sensor or device interface 170 or short-range wireless compatible sensor or device interface 180. In another alternative embodiment, computing infrastructure 100 includes only one or more of LPWAN compatible IoT sensor or device interface 170 without any Wi-Fi compatible IoT sensor 160 or short-range wireless compatible sensor or device interface 180. In another alternative embodiment, computing infrastructure 100 includes only one or more of short-range wireless compatible sensor or device interface 180 without any Wi-Fi compatible IoT sensor 160 or LPWAN compatible IoT sensor or device interface 170. In another alternative embodiment, computing infrastructure includes only one or more of LPWAN compatible IoT sensor or device interface 170 and one or more of short-range wireless compatible sensor or device interface 180 without any Wi-Fi compatible IoT sensor 160.

Computer infrastructure 100 as illustrated includes a cloud server system 185. Cloud server system 185 includes, or is communicatively coupled to, a virtualized management system 190. In an embodiment, virtualized management system 190 is a property management system (PMS). In the context of the various embodiments described herein, a PMS is a computerized system configured to manage a property such as a business premises or environment, e.g., via a single software module. According to such embodiment, virtualized management system 190 optionally is a PMS specialized for hotel or hospitality premises, e.g., a hotel operating system (HOS). Such HOS is configured to facilitate reservation management or other administrative tasks. System-on-a-chip microcontroller 115 of universal interface apparatus 105 is configured to communicate with cloud server system 185 and more specifically virtualized management system 190 via a Wi-Fi router network 195. In an embodiment, system-on-a-chip microcontroller 115 is configured to communicate with a single Wi-Fi router in Wi-Fi router network 195 at any given point in time. Universal interface apparatus 105 is configured to function as a unified access point to cloud server system 185 and virtualized management system 190 for a set of serial and/or wireless IoT components associated with the certain premises or environment that are included in computing infrastructure 100. Accordingly, universal interface apparatus 105 is configured to provide a universal gateway solution between serial and/or wireless IoT components associated with the certain premises or environment and a remote, e.g., cloud-based, system. As further described herein, serial device 150, Wi-Fi compatible IoT sensor 160, LPWAN compatible IoT sensor or device interface 170, and/or short-range wireless compatible sensor or device interface 180 transmit messages, and receive messages from, virtualized management system 190 via system-on-a-chip microcontroller 115 of universal interface apparatus 105.

One or more aspects of computing infrastructure 100, including universal interface apparatus 105, administrative server system 125, cloud server system 185 and/or respective components thereof, are configured to provide appropriate client notice with respect to any personal data collection associated with message processing. One or more aspects of computing infrastructure 100 further are configured to provide any client an option to opt in or opt out of any such personal data collection at any time. Optionally, one or more aspects of computing infrastructure 100 further are configured to transmit at least one notification to any affected client each time any such personal data collection occurs.

Figure 2:
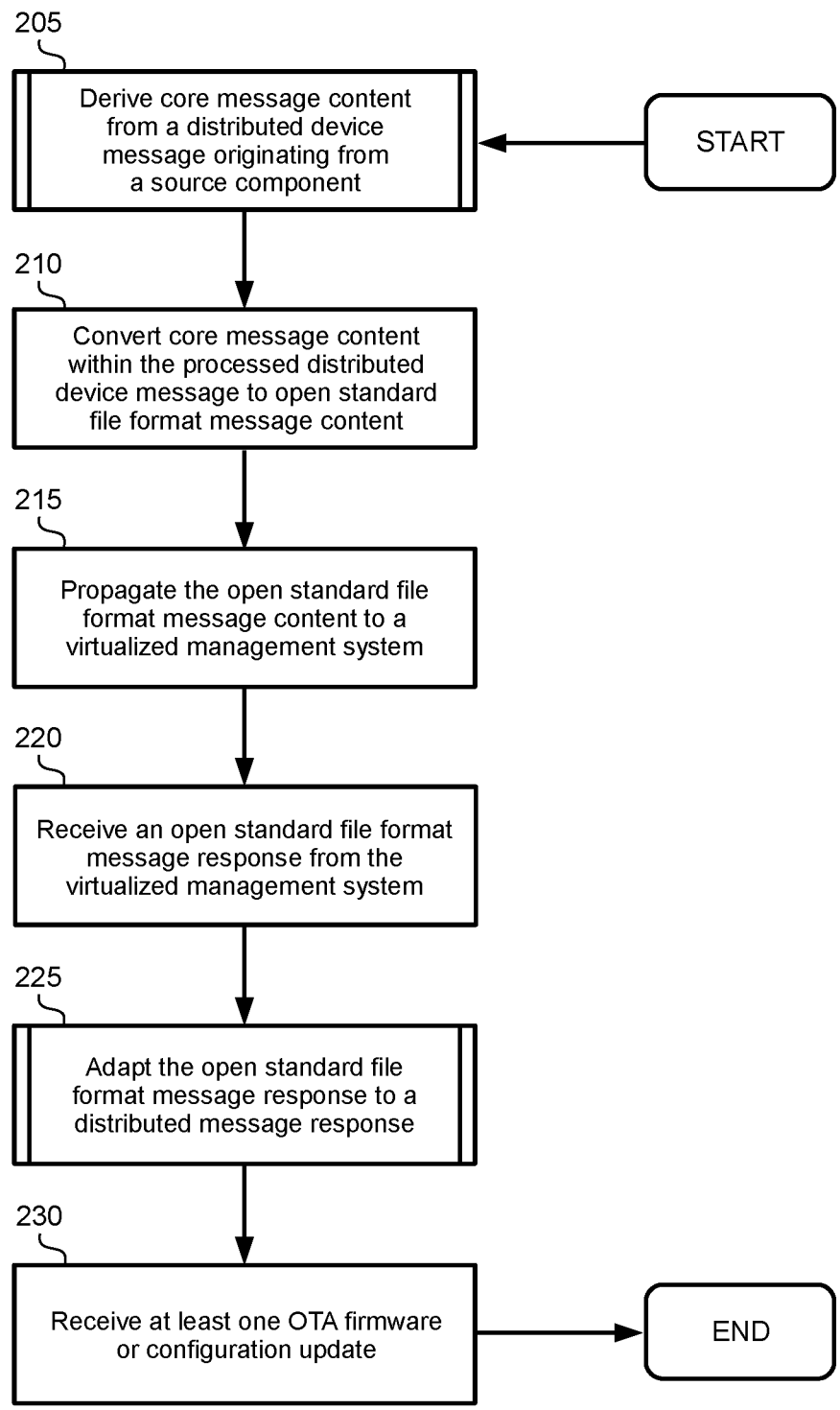
FIG. 2 illustrates a method of managing a distributed device message originating from a source component, according to one or more embodiments.

FIG. 2 illustrates a method 200 pertaining to distributed device message management. One or more steps of the method 200 and associated methods described herein are carried out in a computing infrastructure associated with a managed premises or environment including components having connectivity to a cloud server system and more specifically to a virtualized management system via a universal interface apparatus (e.g., computing infrastructure 100 including components having connectivity to cloud server system 185 and more specifically to virtualized management system 190 via universal interface apparatus 105). The steps of the method 200 are described from the purview of a system-on-a-chip microcontroller of the universal interface apparatus in the computing infrastructure (e.g., system-on-a-chip microcontroller 115). While most embodiments associated with the method 200 and associated methods described herein pertain to the universal interface apparatus singularly, additional or alternative embodiments among the various embodiments optionally pertain to multiple universal interface apparatuses in the computing infrastructure. Additionally or alternatively to the computing infrastructure, one or more steps of the method 200 and associated methods described herein optionally are carried out fully or partially within one or more workloads of a cloud computing environment.

The method 200 begins at step 205, where the system-on-a-chip microcontroller of the universal interface apparatus derives core message content from a distributed device message originating from a source component in the computing infrastructure. In the context of the various embodiments, a source component in the computing infrastructure is a hardware-based component, such as a sensor or device interface, from which the distributed device message is transmitted to the universal interface apparatus.

Optionally, the distributed device message is a serial message originating from a serial device source component (e.g., serial device 150). In the context of the various embodiments described herein, a serial message is a message sent bit by bit via a conduit or bus. In an embodiment, the serial device is hardware-based. The serial device transmits the serial message via a serial interface. In an additional embodiment, the serial message is a request. According to such additional embodiment, such request optionally includes a data request or a status request. According to such additional embodiment, such request optionally incorporates a client authentication request for use of one or more resources associated with the managed premises or environment. According to such additional embodiment, such request optionally incorporates an acknowledgment request, e.g., for a legacy serial device. In a further embodiment, the serial interface includes a D-subminiature connector. According to such further embodiment, the serial interface optionally includes a DB-25 pin connector. Alternatively, the serial interface optionally includes a DB-9 pin connector. Alternatively, the serial interface optionally includes another D-subminiature connector variety. A method with regard to processing a serial distributed device message originating from a serial source component in accordance with step 205 is described herein with respect to FIG. 3.

Alternatively, the distributed device message is a wireless message originating from a wireless IoT source component. According to such alternative, the wireless IoT source component is a hardware-based. Optionally, the wireless IoT source component is or includes a sensor. In an embodiment, the wireless message is or includes a request. According to such embodiment, such request optionally includes a data request or a status request. According to such embodiment, such request optionally incorporates a client authentication request for use of one or more resources associated with the managed premises or environment. In an additional embodiment, the wireless distributed device message originates from a Wi-Fi compatible IoT sensor (e.g., Wi-Fi compatible IoT sensor 160). A method with regard to processing a wireless distributed device message originating from a Wi-Fi compatible IoT source component in accordance with step 205 is described herein with respect to FIG. 5. In a further embodiment, the wireless distributed device message originates from an LPWAN compatible IoT sensor or device interface (e.g., LPWAN compatible IoT sensor or device interface 170). A method with regard to processing a wireless distributed device message originating from an LPWAN compatible IoT source component in accordance with step 205 is described herein with respect to FIG. 6. In a further embodiment, the wireless distributed device message originates from a short-range wireless compatible IoT sensor or device interface (e.g., short-range wireless compatible IoT sensor or device interface 180). A method with regard to processing a wireless distributed device message originating from a short-range wireless compatible IoT source component in accordance with step 205 is described herein with respect to FIG. 7.

In an embodiment, the system-on-a-chip microcontroller is a low power development board. In a related embodiment, the system-on-a-chip microcontroller is an ESP32 microcontroller board. In a further related embodiment, the system-on-a-chip microcontroller is battery operable. According to such further related embodiment, the system-on-a-chip microcontroller is at least partially powered and/or is at least temporarily powered via at least one battery. The at least one battery optionally includes a lithium ion polymer (LiPo) battery. The at least one battery optionally is a single battery of less than 5V, e.g., 3.7V. In a further related embodiment, the system-on-a-chip microcontroller includes smart device power modes, e.g., "Sleep" and "Deep Sleep", that optionally are governed based upon usage of electricity or battery power. One or more of such smart device power modes, particularly low power mode(s) and/or a no power mode, support offline functionality and/or offline data preservation for a period during which network connectivity is temporarily disrupted and subsequently restored. In an additional embodiment, the system-on-a-chip microcontroller includes Wi-Fi capabilities. Additionally or alternatively, the system-on-a-chip microcontroller includes LPWAN capabilities, e.g., LoRaWAN® capabilities, for long-range communications via a low-power wide area network. Additionally or alternatively, the system-on-a-chip microcontroller includes short-range wireless capabilities, e.g., Bluetooth® capabilities, for short-range communications.

In an embodiment, the system-on-a-chip microcontroller of the universal interface apparatus is configured to send and receive communication within an IoT framework and further is configured to function as an access point for internet communications. According to such embodiment, the system-on-a-chip microcontroller is configured to send data to and receive data from a remote system, such as the virtualized management system or another cloud-based system, via a Wi-Fi router in a Wi-Fi router network (e.g., Wi-Fi router network 195). In a related embodiment, the system-on-a-chip microcontroller is configured to connect to a closest Wi-Fi router in the Wi-Fi router network for which connectivity credentials are stored. In a further related embodiment, the system-on-a-chip microcontroller is configured to store connectivity credentials for multiple Wi-Fi routers in the Wi-Fi router network, e.g., a router identifier, a connectivity key/password, and any other connectivity credential(s) necessary to establish a connection with the multiple Wi-Fi routers. According to such related embodiments, responsive to a failure affecting the Wi-Fi router in the Wi-Fi router network via which the system-on-a-chip microcontroller is connected to the virtualized management system (e.g., responsive to a connectivity failure or other failure associated with Wi-Fi router functionality), the system-on-a-chip microcontroller is configured to automatically connect to another Wi-Fi router in the Wi-Fi router network for which connectivity credentials are stored automatically. Such other Wi-Fi router optionally is a second closest Wi-Fi router or another Wi-Fi router predesignated by or for the system-on-a-chip microcontroller. In a further related embodiment, upon resolution of the failure, the system-on-a-chip microcontroller optionally is configured to automatically re-connect to the Wi-Fi router affected by the failure. In the context of the various embodiments, automatic Wi-Fi router connection/re-connection signifies connection/re-connection without intervention from an external party, system, or device. In a further embodiment, the system-on-a-chip microcontroller is configured to connect to the Wi-Fi router network through one of multiple network service providers for which connectivity credentials are stored. According to such further embodiment, in the event that connectivity is lost from a current network service provider, the system-on-a-chip microcontroller is configured to connect to a different network service provider among the multiple service providers automatically, i.e., without intervention from an external party, system, or device.

In an embodiment, the system-on-a-chip microcontroller of the universal interface apparatus is dual core. According to such embodiment, the dual-core system-on-a-chip microcontroller enables the universal interface apparatus to send and receive data to and from source components associated with the managed premises or environment (i.e., endpoints) and/or cloud-based components (e.g., the virtualized management system as described herein) from two different processor cores. According to one implementation, one core is dedicated to sending data to source components and/or cloud-based components, and other core is dedicated to receiving data from source components and/or cloud-based components. The universal interface apparatus synchronizes or otherwise coordinates activity associated with the two cores via one or more synchronization processes. The one or more synchronization processes optionally include inter-process communication, e.g., to manage shared data or resources. Additionally or alternatively, the one or more synchronization processes optionally include use of at least one lock or at least one mutex configured to enforce a concurrency control policy based upon mutual exclusion. Additionally or alternatively, the one or more synchronization processes optionally include use of at least one semaphore configured to enforce a concurrency control policy with respect to system resources based upon one or more process variables or abstract data types. In a further embodiment, the system-on-a-chip microcontroller is operatively coupled to at least one hardware-based storage component configured to store write log information (e.g., at least one memory module 120). The at least one hardware-based storage component optionally includes a micro TransFlash (TF) or secure digital (SD) card memory shield module. In a further embodiment, one or more processor cores of the system-on-a-chip microcontroller run a real-time operating system (RTOS) designed for interaction with IoT devices or other source components associated with the managed premises or environment.

At step 210, the system-on-a-chip microcontroller of the universal interface apparatus converts core message content within the processed distributed device message to open standard file format message content. In the context of the various embodiments described herein, core message content includes any message content associated with virtualized management system processing, exclusive of source component interface-specific message content. Core message content merely includes message content necessary or otherwise relevant to virtualized management system processing and does not include any content relevant only to interface(s) of the source component. The core message content optionally includes any request to be processed by the virtualized management system. Additionally or alternatively, the core message content optionally includes any data update to be provided to the virtualized management system. In an embodiment, the open standard file format is JavaScript Object Notation (JSON). In an additional embodiment, the open standard file format is Extensible Markup Language (XML). By converting the distributed device message to an open standard file format compatible with digital data applications, the system-on-a-chip microcontroller enables legacy devices using serial communication having proprietary protocols, as well as wireless IoT devices, to communicate with cloud applications or other virtualized applications. More generally, the universal interface apparatus enables conversion of various message types from both serial and wireless devices into an open standard file format compatible with cloud-based devices and other virtualized entities. Such conversion permits standardization of messages of heterogeneous format from serial and/or wireless devices.

At step 215, the system-on-a-chip microcontroller of the universal interface apparatus propagates the open standard file format message content to the virtualized management system. In an embodiment, the virtualized management system is a remote cloud-based PMS.

Optionally, the PMS is specialized for hospitality, e.g., an HOS. In an additional embodiment, the system-on-a-chip microcontroller propagates one or more data aspects of the open standard file format message content via a representational state transfer (REST) API. Additionally or alternatively, the system-on-a-chip microcontroller propagates one or more data aspects of the open standard file format message content via a Message Queuing Telemetry Transport (MQTT) broker. Additionally or alternatively, the system-on-a-chip microcontroller propagates one or more data aspects of the open standard file format message content via a software bus implementation using stream-processing, such as Apache Kafka®. In a further embodiment, in accordance with a REST API, MQTT protocol, and/or a software bus implementation using stream-processing, the universal interface apparatus optionally communicates with the virtualized management system at least in part via a publish-subscribe message architecture pattern, such that distributed device message topic(s) associated with premises management may be published and/or subscribed to. In a further embodiment, the system-on-a-chip microcontroller encrypts the open standard file format message content or data aspects thereof prior to propagating such content or data aspects to the virtualized management system. According to such further embodiment, the system-on-a-chip microcontroller applies at least one encryption algorithm to such content or data aspects. In a further embodiment, the system-on-a-chip microcontroller applies at least one cryptographic hash function to the open standard file format message content or data aspects thereof prior to propagating such content or data aspects to the virtualized management system. According to such further embodiment, the at least one cryptographic hash function optionally includes a Secure Hash Algorithm 2 (SHA-2) function, e.g., SHA-256.

At step 220, the system-on-a-chip microcontroller of the universal interface apparatus receives an open standard file format message response from the virtualized management system. In an embodiment, the open standard file format message response is in a same format or formats as corresponding aspects of the open standard file format message data as propagated at step 215. In an embodiment, the system-on-a-chip microcontroller receives one or more aspects of the open standard file format message response via a REST API. Additionally or alternatively, the system-on-a-chip microcontroller receives one or more aspects of the open standard file format message response via a MQTT broker. Additionally or alternatively, the system-on-a-chip microcontroller receives one or more aspects of the open standard file format message response via a software bus implementation using stream-processing, such as Apache Kafka®. In a further embodiment, the system-on-a-chip microcontroller receives one or more aspects of the open standard file format message response in accordance with a publish-subscribe message architecture pattern.

At step 225, the system-on-a-chip microcontroller of the universal interface apparatus adapts the open standard file format message response to a distributed message response for relay to the source component from which the distributed device message originated. In an embodiment, in the context of certain serial messages, e.g., originating from a serial device source component having a legacy serial interface, the system-on-a-chip microcontroller provides an acknowledgment message, either an ACK (acknowledgement) response indicating message transmission success or a NAK (non-acknowledgment) response indicating message transmission failure, to the serial interface. In a further embodiment, the system-on-a-chip microcontroller sends a signal corresponding to the acknowledgment message to at least one hardware-based acknowledgment message indicator element associated with the universal interface apparatus (e.g., at least one message indicator 145). The at least one acknowledgment message indicator element optionally includes an LED and/or an LCD screen. According to such further embodiment, in the event that the acknowledgment message is an ACK response, the system-on-a-chip microcontroller sends a signal indicating message transmission success to the at least one acknowledgment message indicator element, e.g., which optionally is associated with a green LED or a success message displayed on the LCD screen. According to such further embodiment, in the event that the acknowledgment message is a NAK response, the system-on-a-chip microcontroller sends a signal indicating message transmission failure to the at least one acknowledgment message indicator element, e.g., which optionally is associated with a red LED or a failure message displayed on the LCD screen. The system-on-a-chip microcontroller creates the acknowledgement message based upon receipt of the open standard file format message response from the virtualized management system. The system-on-a-chip microcontroller creates the acknowledgment message based upon whether message structure is correct and a checksum code (i.e., checksum character) is correct. Such checksum code is originally created and added by the serial device. Through support of acknowledgment processing, the system-on-a-chip microcontroller is configured to facilitate communication between legacy on-premises devices, including devices with a serial interface, and cloud-native systems, e.g., PMS and other commercial (e.g., hospitality industry) enterprise systems.

According to additional embodiments, particularly in the context of wireless messages originating from a Wi-Fi compatible IoT source component, an LPWAN compatible IoT source component, or a short-range wireless compatible IoT source component, further processing, which optionally includes one or more of decryption, parsing, and format conversion, is necessary to adapt the open standard file format message response to the distributed message response. A method with regard to adapting the open standard file format message response to the distributed message response for relay to the source component in accordance with step 225 is described herein with respect to FIG. 8.

At step 230, the system-on-a-chip microcontroller of the universal interface apparatus receives at least one OTA firmware or configuration update. According to step 230, when the system-on-a-chip microcontroller of the universal interface apparatus functions as an access point, the universal interface apparatus receives at least one firmware update and/or at least one update pertaining to adding, updating, and/or deleting an interface configuration. The system-on-a-chip microcontroller receives the OTA firmware or configuration update from an administrative server system (e.g., administrative server system 125) associated with the managed premises or environment that is responsible for managing and/or maintaining the universal interface apparatus. The administrative server system coordinates computing activity within the IoT computing infrastructure, thus functioning as a centralized control entity within the managed premises or environment. In an embodiment, the system-on-a-chip microcontroller automatically receives one or more of at least one OTA firmware or configuration update, e.g., via a push notification from the administrative server system. Additionally or alternatively, the system-on-a-chip microcontroller receives one or more of the at least one OTA firmware or configuration update in response to an update request sent to the administrative server system, e.g., via a pull request sent to the administrative server system. Optionally, in the context of the pull request, the system-on-a-chip microcontroller communicates with a File Transfer Protocol (FTP) server located within or associated with the administrative server system. In an additional embodiment, the at least one OTA firmware or configuration update includes at least one update to the REST API. In a further embodiment, the at least one OTA firmware or configuration update includes at least one update to one or more MQTT broker aspects. In a further embodiment, the at least one OTA firmware or configuration update includes at least one update to Wi-Fi credentials, LPWAN credentials, short-range wireless credentials, and/or one or more other network-related aspects. In a further embodiment, the system-on-a-chip microcontroller optionally receives at least one OTA firmware or configuration update according to step 230 at any time, e.g., asynchronously with respect to other steps of the method 200. According to such further embodiment, the system-on-a-chip microcontroller optionally receives one or more of the at least one OTA firmware or configuration update prior to and/or simultaneously with execution of one or more other steps of the method 200. In a further embodiment, the administrative server system is configured to communicate with any universal interface apparatus associated with the IoT computing infrastructure, such that multiple universal interface apparatuses having respective system-on-a-chip microcontrollers are configurable within the managed premises or environment.

Figure 3:
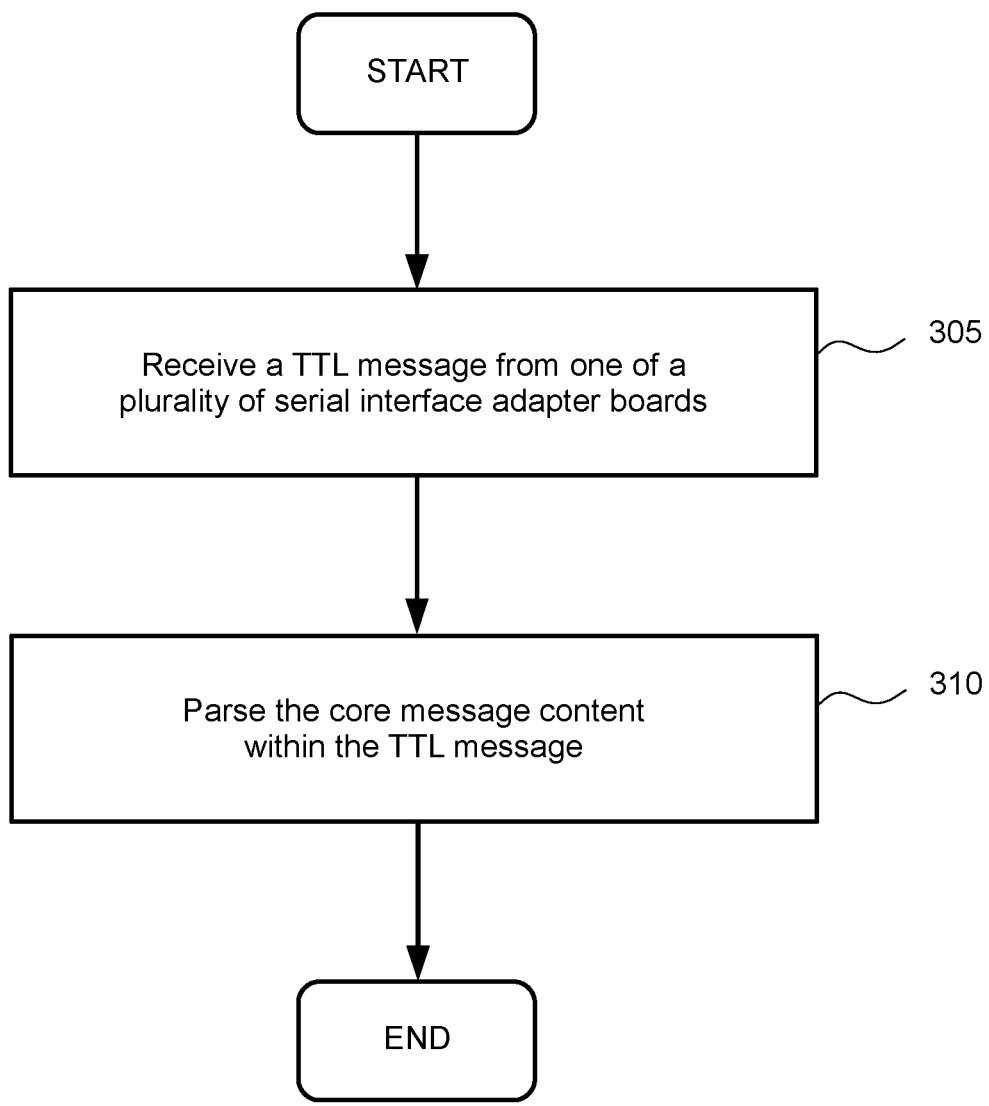
FIG. 3 illustrates a method of deriving core message content from a serial distributed device message originating from a serial source component, according to one or more embodiments.

FIG. 3 illustrates a method 300 of deriving the core message content from the distributed device message. The method 300 provides one or more embodiments with respect to step 205 of the method 200. In the context of the method 300, the distributed device message is a serial message, and the source component is a serial device. The steps of the method 300 are described from the purview of the system-on-a-chip microcontroller of the universal interface apparatus. The method 300 begins at step 305, where the system-on-a-chip microcontroller of the universal interface apparatus receives a transistor-translator logic (TTL) message from one of a plurality of serial interface adapter boards of the universal interface apparatus (e.g., serial interface adapter boards 110). The plurality of serial interface adapter boards are configured to convert the distributed device message to the TTL message. The TTL message includes the core message content to be converted by the system-on-a-chip microcontroller according to step 210. In an embodiment, a RS-232 to TTL serial interface adapter board among the plurality of serial interface adapter boards facilitates transmission of the TTL message to the system-on-a-chip microcontroller, e.g., an ESP32 microcontroller board. A method with regard to converting the serial distributed device message to the TTL message via the plurality of serial interface adapter boards is described herein with respect to FIG. 4. At step 310, the system-on-a-chip microcontroller of the universal interface apparatus parses the core message content within the TTL message. In an embodiment, parsing according to step 310 includes separating the core message content, which is to be converted to open standard file format content for purposes of propagation to the virtualized management system, from serial interface-specific message content. Through parsing, the system-on-a-chip microcontroller converts and propagates only essential aspects of the distributed device message, converted to TTL format via the plurality of serial interface adapter boards, to the virtualized management system, exclusive of serial interface-specific message content.

In sum, deriving the core message content from the distributed device message according to the method 300, wherein the distributed device message is a serial message and the source component is a serial device, includes receiving a TTL message from one of a plurality of serial interface adapter boards, wherein the plurality of serial interface adapter boards are configured to convert the distributed device message to the TTL message. The method 300 further includes parsing the core message content within the TTL message.

Figure 4:
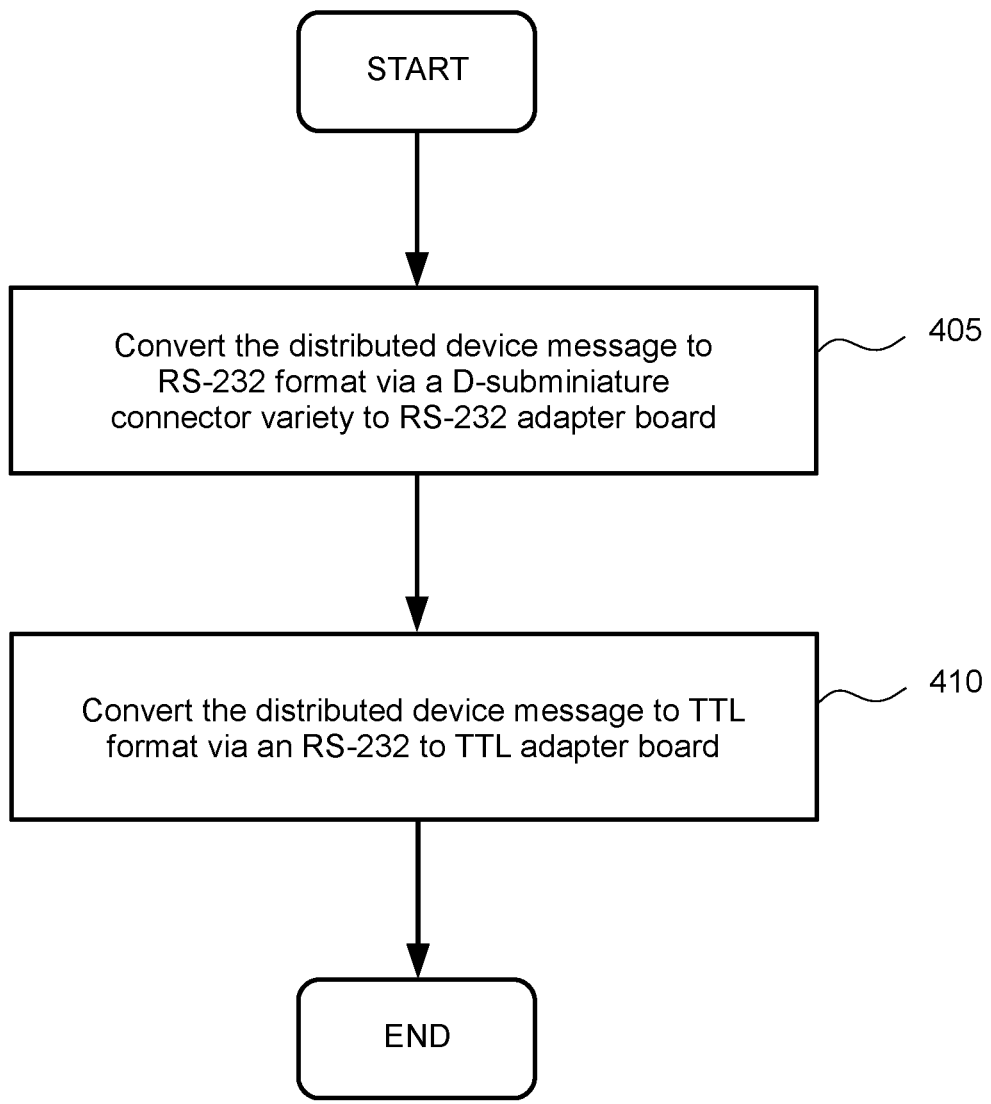
FIG. 4 illustrates a method of converting a distributed device message to a transistor-translator logic (TTL) message via a plurality of serial interface adapter boards, according to one or more embodiments.

FIG. 4 illustrates a method 400 of converting the distributed device message to the TTL message. The steps of the method 400 are described from the purview of the plurality of serial interface adapter boards of the universal interface apparatus. The method 400 begins at step 405, where an adapter board among the plurality of serial interface adapter boards configured to adapt a D-subminiature connector variety format to RS-232 format converts the distributed device message from the D-subminiature connector variety format to the RS-232 format. In an embodiment, the serial interface adapter board configured to adapt a D-subminiature connector variety format to the RS-232 format is a DB-25 to RS-232 adapter board. According to such embodiment, the DB-25 to RS-232 adapter board converts the distributed device message from DB-25 format to the RS-232 format. In a further embodiment, the serial interface adapter board configured to adapt a D-subminiature connector variety format to the RS-232 format is a DB-9 to RS-232 adapter board. According to such embodiment, the DB-9 to RS-232 adapter board converts the distributed device message from DB-9 format to the RS-232 format. At step 410, an adapter board among the plurality of serial interface adapter boards configured to adapt the RS-232 format to TTL format converts the distributed device message from the RS-232 format to the TTL format. In an embodiment, according to the method 400, the distributed device message is converted to the TTL format first via a DB-25 to RS-232 adapter board and subsequently via a RS-232 to TTL adapter board. In a further embodiment, according to the method 400, the distributed device message is converted to the TTL format first via a DB-9 to RS-232 adapter board and subsequently via a RS-232 to TTL adapter board. In one or more further embodiments, according to the method 400, the distributed device message is converted to the TTL format first via a serial interface adapter board configured to convert an alternative D-subminiature connector variety format to RS-232 format and subsequently via a RS-232 to TTL adapter board, depending on particular system implementations.

In sum, according to the method 400, the plurality of serial interface adapter boards of the universal interface apparatus are configured to convert the distributed device message to the TTL message by converting the distributed device message to RS-232 format via an adapter board configured to adapt a D-subminiature connector variety format to the RS-232 format and by converting the distributed device message to TTL format via an adapter board configured to adapt the RS-232 format to the TTL format.

Figure 5:
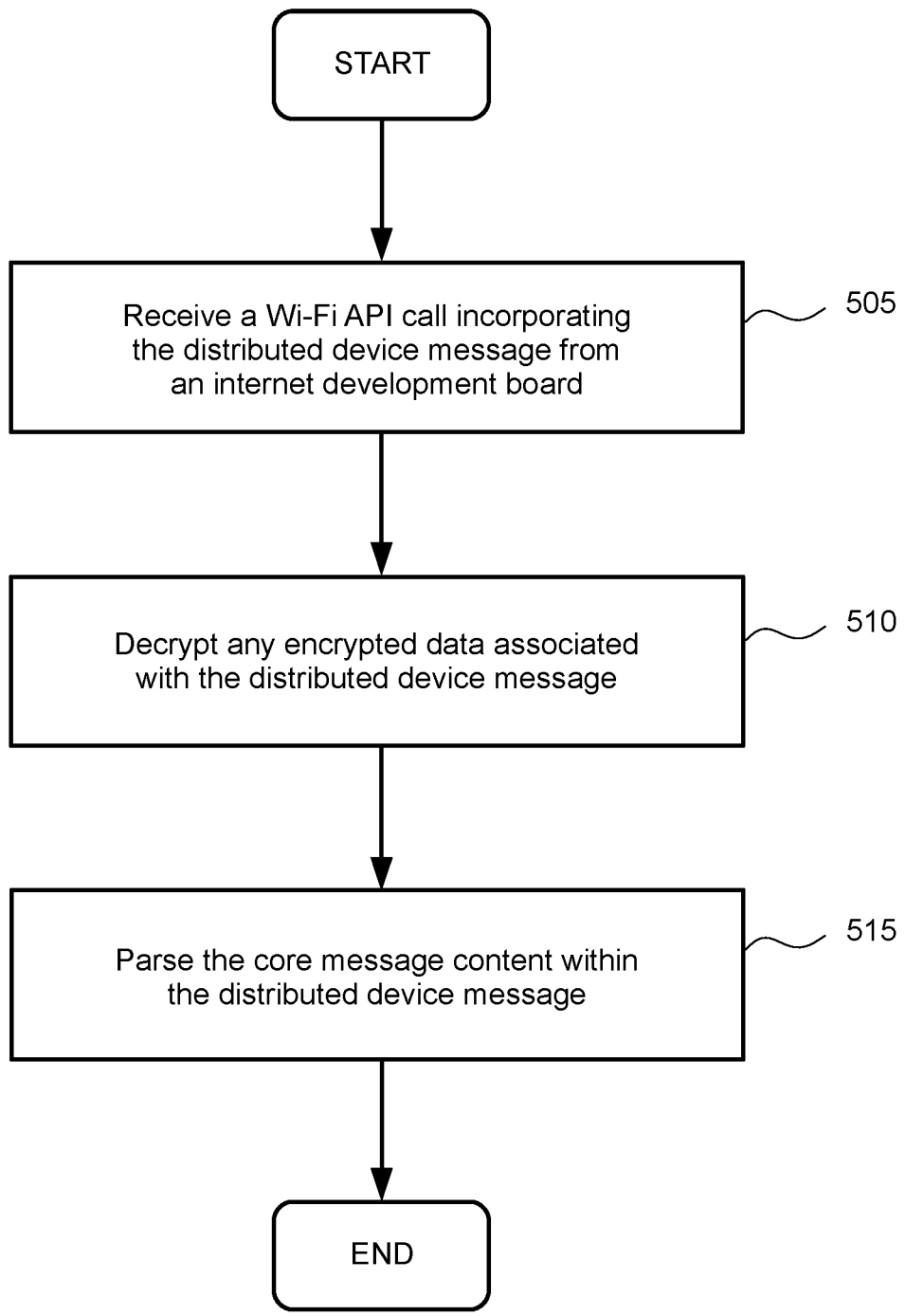
FIG. 5 illustrates a method of deriving core message content from a wireless distributed device message originating from a Wi-Fi compatible IoT source component, according to one or more embodiments.

FIG. 5 illustrates a method 500 of processing the distributed device message in the computing infrastructure. The method 500 provides one or more further embodiments with respect to step 205 of the method 200. In the context of the method 500, the distributed device message is a wireless message, and the source component is a Wi-Fi compatible IoT sensor. In an embodiment, the Wi-Fi compatible IoT source component is or includes a digital sensor and/or an analog sensor, e.g., an IoT sensor. In an alternative embodiment, the Wi-Fi compatible IoT source component includes a device interface. In a further embodiment, the Wi-Fi compatible IoT source component incorporates at least one hardware component. The steps of the method 500 are described from the purview of the system-on-a-chip microcontroller of the universal interface apparatus. The method 500 begins at step 505, where the system-on-a-chip microcontroller of the universal interface apparatus receives a Wi-Fi API call incorporating the distributed device message from an internet development board among a plurality of internet development boards communicatively coupled to the Wi-Fi compatible IoT sensor (e.g., internet development board 165). According to step 505, the system-on-a-chip microcontroller of the universal interface apparatus functions as a Wi-Fi access point, facilitating wireless internet communication in addition to or as an alternative to serial communication. In an embodiment, the internet development board transmitting the Wi-Fi API call received according to step 505 and/or one or more other internet development boards among the plurality of internet development boards are Wi-Fi microcontroller development board(s), e.g., WeMos microcontroller board(s). In a further embodiment, the internet development board transmitting the Wi-Fi API call and/or one or more other internet development boards among the plurality of internet development boards are system-on-a-chip microcontroller board(s) external to the universal interface apparatus, i.e., a system-on-a-chip microcontroller(s) separate from the system-on-a-chip microcontroller of the universal interface apparatus. According to such further embodiment, any such external system-on-a-chip microcontroller board is Wi-Fi enabled. According to such further embodiment, any such external system-on-a-chip microcontroller board optionally is an ESP32 microcontroller board. Each of the plurality of internet development boards is configured to function in Wi-Fi station mode. In Wi-Fi station mode, an internet development board among the plurality of internet development boards provides Wi-Fi endpoint connectivity by communicating to the system-on-a-chip microcontroller of the universal interface apparatus functioning as an access point. According to such embodiments, the plurality of internet development boards optionally include at least one Wi-Fi microcontroller development board (e.g., WeMos microcontroller board) and at least one external system-on-a-chip microcontroller board (e.g., ESP32 microcontroller board). Responsive to determining a failure or communication disruption of the internet development board transmitting the Wi-Fi API call received according to step 505, the system-on-a-chip microcontroller of the universal interface apparatus or the Wi-Fi compatible IoT sensor switches communication to another internet development board among the plurality of internet development boards automatically, i.e., without intervention from an external party, system, or device. In a further embodiment, the plurality of internet development boards are constituent components of a wireless mesh network (WMN) topology, in which case each internet development board is a node within the WMN topology. In a further embodiment, the internet development board transmitting the Wi-Fi API call received according to step 505 functions as a Wi-Fi repeater. In the context of the various embodiments, a Wi-Fi repeater facilitates range extension of a Wi-Fi network by forwarding wireless messages from another internet development board or Wi-Fi routing device to a destination or to an intermediate destination. According to such further embodiment, the internet development board transmitting the Wi-Fi API call receives the distributed device message or content associated therewith from one or more other internet development boards/Wi-Fi routing devices in communication with the Wi-Fi compatible IoT sensor.

At step 510, the system-on-a-chip microcontroller of the universal interface apparatus decrypts any encrypted data associated with the distributed device message. At step 515, the system-on-a-chip microcontroller of the universal interface apparatus parses the core message content within the distributed device message. The system-on-a-chip microcontroller parses the core message content in preparation for open standard file format conversion in accordance with step 210. In an embodiment, the parsing includes separating the core message content, which is to be converted to open standard file format content for purposes of propagation to the virtualized management system, from Wi-Fi interface-specific message content. Through parsing, the system-on-a-chip microcontroller converts and propagates only essential aspects of the distributed device message to the virtualized management system, exclusive of Wi-Fi interface-specific message content.

In sum, deriving the core message content from the distributed device message according to the method 500, wherein the distributed device message is a wireless message and the source component is a Wi-Fi compatible IoT sensor, includes receiving a Wi-Fi API call incorporating the distributed device message from an internet development board among a plurality of internet development boards communicatively coupled to the Wi-Fi compatible IoT sensor, decrypting any encrypted data associated with the distributed device message, and parsing the core message content within the distributed device message.

Figure 6:
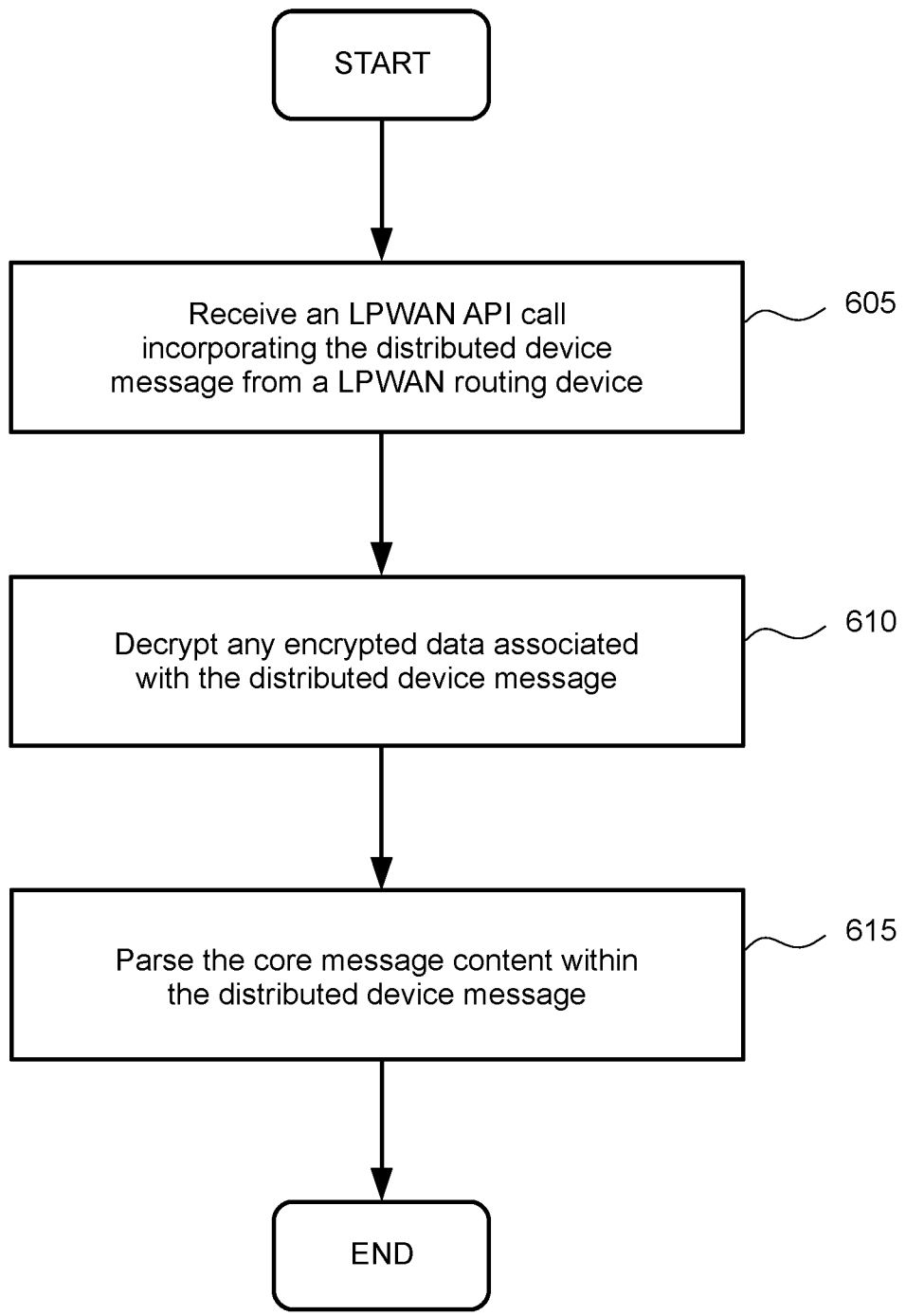
FIG. 6 illustrates a method of deriving core message content from a wireless distributed device message originating from an LPWAN compatible IoT source component, according to one or more embodiments.

FIG. 6 illustrates a method 600 of processing the distributed device message in the computing infrastructure. The method 600 provides one or more further embodiments with respect to step 205 of the method 200. In the context of the method 600, the distributed device message is a wireless message, and the source component is an LPWAN compatible IoT sensor or device interface. In an embodiment, the LPWAN compatible IoT source component is or includes a digital sensor and/or an analog sensor, e.g., an IoT sensor. In an additional embodiment, the LPWAN compatible IoT source component is or includes a device interface. In a further embodiment, the LPWAN compatible IoT source component incorporates at least one hardware component. The steps of the method 600 are described from the purview of the system-on-a-chip microcontroller of the universal interface apparatus. The method 600 begins at step 605, where the system-on-a-chip microcontroller of the universal interface apparatus receives an LPWAN API call incorporating the distributed device message from an LPWAN routing device among a plurality of LPWAN routing devices communicatively coupled to the LPWAN compatible IoT sensor or device interface (e.g., LPWAN routing device 175). According to step 605, the system-on-a-chip microcontroller of the universal interface apparatus functions as an LPWAN access point, facilitating wireless internet communication in addition to or as an alternative to serial communication. In an embodiment, the LPWAN compatible wireless IoT device is a LoRaWAN® compatible network device. According to such embodiment, the LoRaWAN® compatible network device sends and receives communications via one or more LPWAN routing devices among the plurality of LPWAN routing devices having LoRaWAN® compatibility. According to such embodiment, the LPWAN API call is a LoRaWAN® API call. In an additional embodiment, the LPWAN routing device transmitting the LPWAN API call received according to step 605 and/or one or more other LPWAN routing devices among the plurality of LPWAN routing devices are LPWAN router(s) dedicated to sending and receiving LPWAN wireless messages. In a further embodiment, the LPWAN routing device transmitting the LPWAN API call and/or one or more other LPWAN routing devices among the plurality of LPWAN routing devices are system-on-a-chip microcontroller board(s) external to the universal interface apparatus, i.e., system-on-a-chip microcontroller(s) separate from the system-on-a-chip microcontroller of the universal interface apparatus. According to such further embodiment, any such external system-on-a-chip microcontroller board is LPWAN routing-enabled. According to such further embodiment, any such external system-on-a-chip microcontroller board optionally is an ESP32 microcontroller board. Each of the plurality of LPWAN routing devices is configured to function in station mode as an LPWAN endpoint connectivity device or an LPWAN intermediary routing device in order to route an LPWAN message to the system-on-a-chip microcontroller of the universal interface apparatus functioning as an access point. Optionally, one or more of the plurality of LPWAN routing devices is LoRaWAN® endpoint connectivity device or a LoRaWAN® intermediary routing device configured to route a LoRa® message to the system-on-a-chip microcontroller of the universal interface apparatus.

In an embodiment, the LPWAN routing device transmitting the LPWAN API call received according to step 605 optionally is an LPWAN routing device among the plurality of LPWAN routing devices in closest proximity to the LPWAN compatible wireless IoT device from which the wireless message originated. Alternatively, the LPWAN routing device transmitting the API call receives the wireless message from one or more other LPWAN routing devices among the plurality of LPWAN routing devices in closer proximity to the LPWAN compatible wireless IoT device from which the wireless message originated, which case the LPWAN routing device transmitting the API call functions as an LPWAN repeater. In the context of the various embodiments, an LPWAN repeater facilitates range extension of an LPWAN network by forwarding wireless messages from another LPWAN routing device to a destination or to an intermediate destination. For instance, a LoRaWAN® repeater facilitates range extension of a LoRaWAN® network by forwarding wireless messages from a LoRaWAN® routing device to a destination or to an intermediate destination. LPWAN routing in accordance with the various embodiments enables an LPWAN compatible wireless device to send wireless messages from locations where types of shorter range communication is infeasible. For instance, an LPWAN compatible wireless device such as an on-premises parking sensor may send a wireless message beyond a range of an on-premises Wi-Fi network and/or beyond the range of an on-premises short-range wireless network.

At step 610, the system-on-a-chip microcontroller of the universal interface apparatus decrypts any encrypted data associated with the distributed device message. At step 615, the system-on-a-chip microcontroller of the universal interface apparatus parses the core message content within the distributed device message. The system-on-a-chip microcontroller parses the core message content in preparation for open standard file format conversion in accordance with step 210 of the method 200. In an embodiment, the parsing includes separating the core message content, which is to be converted to open standard file format content for purposes of propagation to the virtualized management system, from LPWAN interface-specific message content. Through parsing, the system-on-a-chip microcontroller converts and propagates only essential aspects of the distributed device message to the virtualized management system, exclusive of LPWAN interface-specific message content.

In sum, deriving the core message content from the distributed device message according to the method 600, wherein the distributed device message is a wireless message and the source component is an LPWAN compatible IoT sensor or device interface, includes receiving an LPWAN API call incorporating the distributed device message from an LPWAN routing device among a plurality of LPWAN routing devices communicatively coupled to the LPWAN compatible IoT sensor or device interface, decrypting any encrypted data associated with the distributed device message, and parsing the core message content within the distributed device message.

Figure 7:
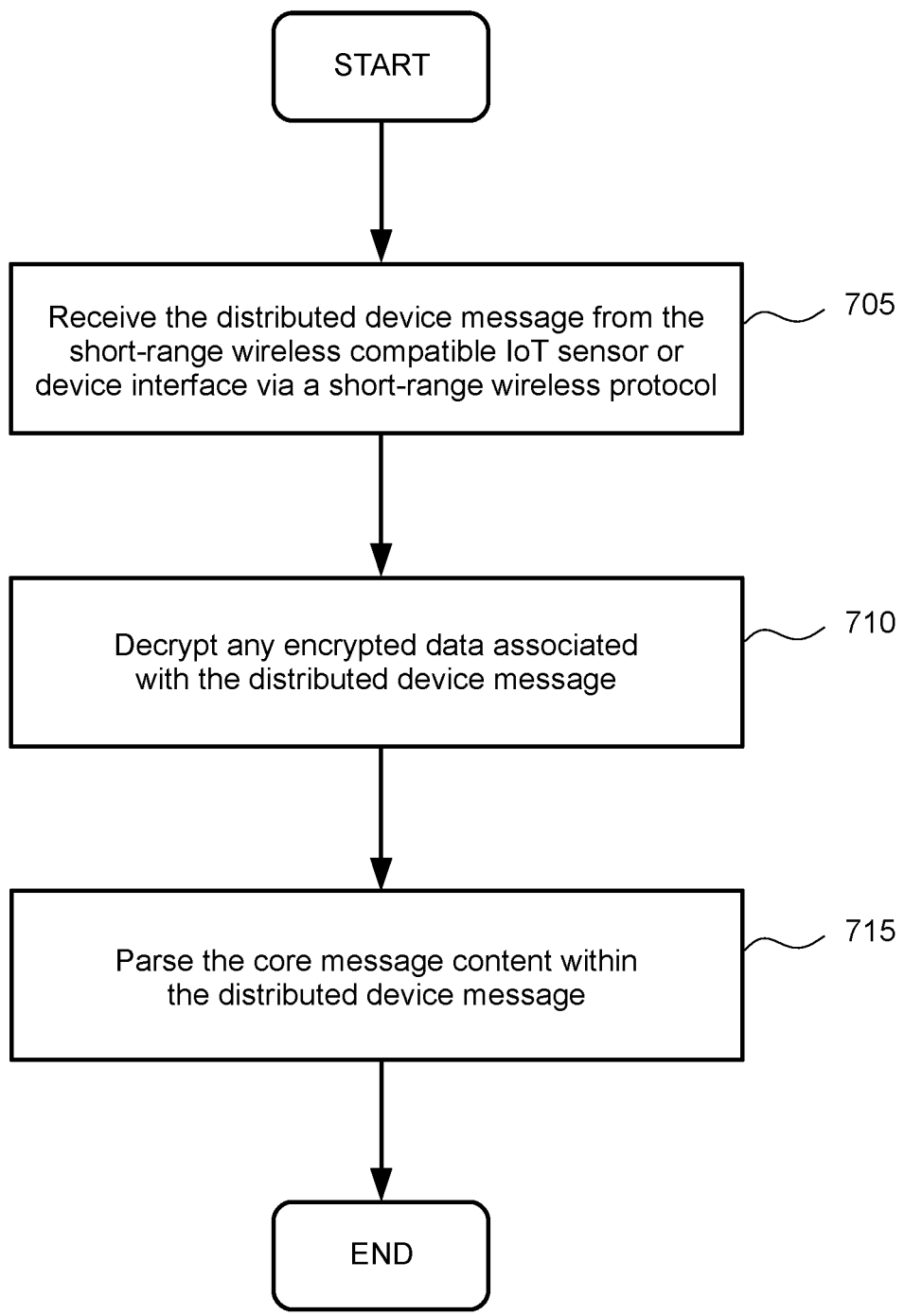
FIG. 7 illustrates a method of deriving core message content from a wireless distributed device message originating from a short-range wireless compatible IoT source component, according to one or more embodiments.

FIG. 7 illustrates a method 700 of processing the distributed device message in the computing infrastructure. The method 700 provides one or more further embodiments with respect to step 205 of the method 200. In the context of the method 700, the distributed device message is a wireless message, and the source component is a short-range wireless compatible IoT sensor or device interface. In an embodiment, the short-range wireless compatible IoT source component is or includes a digital sensor and/or an analog sensor. In an additional embodiment, the short-range wireless compatible IoT source component is or includes a device interface. In a further embodiment, the short-range wireless compatible IoT source component incorporates at least one hardware component. The steps of the method 700 are described from the purview of the system-on-a-chip microcontroller of the universal interface apparatus. The method 700 begins at step 705, where the system-on-a-chip microcontroller of the universal interface apparatus receives the distributed device message from the short-range wireless compatible IoT sensor or device interface via a short-range wireless protocol. According to step 705, the short-range wireless compatible IoT sensor or device interface communicates directly with the system-on-a-chip microcontroller of the universal interface apparatus within a range designed by a short-range wireless protocol. In an embodiment, the short-range wireless compatible IoT sensor or device interface is a Bluetooth® compatible IoT sensor or device interface, and the system-on-a-chip microcontroller of the universal interface apparatus receives the distributed device message directly from the Bluetooth® compatible IoT sensor or device interface in accordance with Bluetooth® communications protocol. According to such embodiment, in the event of multiple Bluetooth® compatible IoT sensors or device interfaces in the computing infrastructure having conflicting Bluetooth® profiles and/or functionality, only one such Bluetooth® compatible IoT component is configured to interface with the system-on-a-chip microcontroller of the universal interface apparatus at a certain time or during a certain time period. Optionally, in the event that the computing infrastructure includes multiple universal interface apparatuses, each respective Bluetooth® compatible IoT component optionally communicates with a system-on-a-chip microcontroller of a different universal interface apparatus among the multiple universal interface apparatuses.

At step 710, the system-on-a-chip microcontroller of the universal interface apparatus decrypts any encrypted data associated with the distributed device message. At step 715, the system-on-a-chip microcontroller of the universal interface apparatus parses the core message content within the distributed device message. The system-on-a-chip microcontroller parses the core message content in preparation for open standard file format conversion in accordance with step 210. In an embodiment, the parsing includes separating the core message content, which is to be converted to open standard file format content for purposes of propagation to the virtualized management system, from short-range wireless interface-specific message content. Through parsing, the system-on-a-chip microcontroller converts and propagates only essential aspects of the distributed device message to the virtualized management system, exclusive of short-range wireless interface-specific message content.

In sum, deriving the core message content from the distributed device message according to the method 700, wherein the distributed device message is a wireless message and the source component is a short-range wireless compatible IoT sensor or device interface, includes receiving the distributed device message from the short-range wireless compatible IoT sensor or device interface via a short-range wireless protocol, decrypting any encrypted data associated with the distributed device message, and parsing the core message content within the distributed device message.

Figure 8:
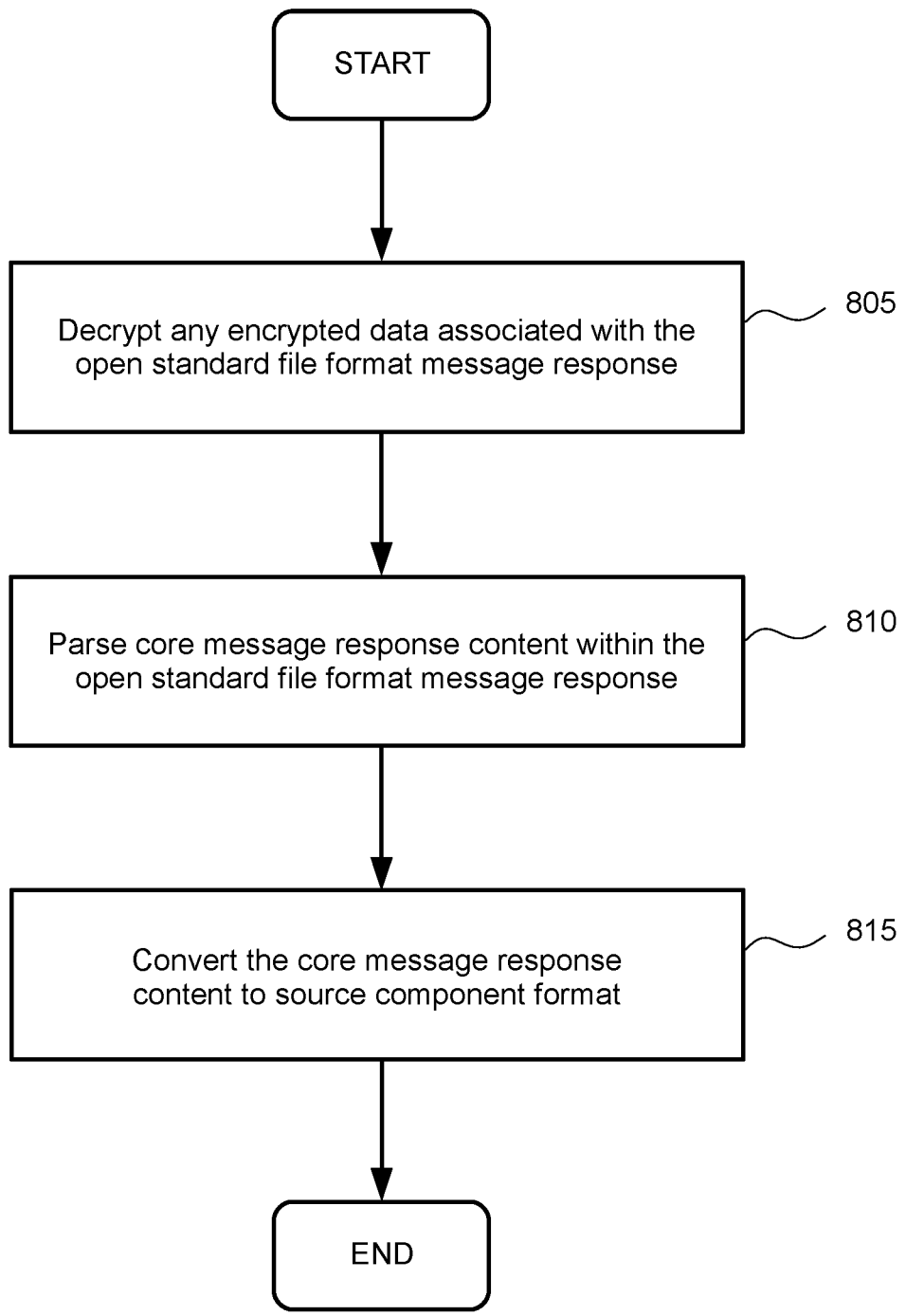
FIG. 8 illustrates a method of adapting an open standard file format message response to a response message for relay to a source component, according to one or more embodiments.

FIG. 8 illustrates a method 800 of adapting the open standard file format message response to the distributed message response for relay to the source component. The method 800 provides one or more embodiments with respect to step 225 of the method 200. The steps of the method 800 are described from the purview of the system-on-a-chip microcontroller of the universal interface apparatus. The method 800 begins at step 805, where the system-on-a-chip microcontroller of the universal interface apparatus decrypts any encrypted data associated with the open standard file format message response. At step 810, the system-on-a-chip microcontroller of the universal interface apparatus parses core message response content within the open standard file format message response. In the context of the various embodiments described herein, core message response content includes any message content relevant to the source component to which the universal interface apparatus relays the distributed message response. The core message response content is not inclusive of any interface-specific message content relevant only to the virtualized management system or the system-on-a-chip microcontroller. At step 815, the system-on-a-chip microcontroller of the universal interface apparatus converts the core message response content to source component format. The source component format is a format compatible with the source component from which the distributed device message originated. In an embodiment, the source component format is identical to or analogous to the format of the distributed device message processed according to step 205. Alternatively, the source component format is a message response format specifically designated by or for the source component and/or administrator(s) thereof.

In sum, adapting the open standard file format message response to the distributed message response according to the method 800 includes decrypting any encrypted data associated with the open standard file format message response, parsing core message response content within the open standard file format message response, and converting the core message response content to source component format.

The descriptions of the various embodiments of the present invention have been presented for purposes of illustration but are not intended to be exhaustive or limited to the embodiments disclosed. All kinds of modifications made to the described embodiments and equivalent arrangements should fall within the protected scope of the invention. Hence, the scope of the invention should be explained most widely according to the claims that follow in connection with the detailed description and should cover all possibly equivalent variations and equivalent arrangements. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method of message management via a system-on-a-chip microcontroller of a universal interface apparatus, wherein the universal interface apparatus is configured to automatically facilitate device discovery within a computing infrastructure, and wherein the method comprises:
   deriving, via the system-on-a-chip microcontroller of the universal interface apparatus, core message content from a distributed device message received from, and transmitted via a first type of hardware interface of a source device, wherein deriving the core message content from the distributed device message includes:
   parsing the distributed device message to separate the core message content from hardware interface specific message content of the first type of hardware interface, wherein the core message content is message content from the distributed device message that is associated with virtual management system processing, exclusive of the hardware interface specific message content of the first type of hardware interface, to be converted to an open standard file format;
   converting the derived core message content to open standard file format message content;
   propagating, via the system-on-a-chip microcontroller of the universal interface apparatus, the open standard file format message content to the virtualized management system via a second, different type of hardware interface than the first type of hardware interface of the source device; and
   receiving, by the system-on-a-chip microcontroller of the universal interface apparatus, an open standard file format message response from the virtualized management system.

2. The computer-implemented method of claim 1, wherein the distributed device message is a serial message and the source device is a serial device, and wherein deriving the core message content comprises:
   receiving a transistor-translator logic (TTL) message from one of a plurality of serial interface adapter boards of the universal interface apparatus, wherein the plurality of serial interface adapter boards are configured to convert the distributed device message to the TTL message; and
   parsing the core message content within the TTL message.

3. The computer-implemented method of claim 1, wherein the distributed device message is a wireless message and the source device is a Wi-Fi compatible IoT sensor, and wherein deriving the core message content comprises:
   receiving a Wi-Fi application programming interface (API) call incorporating the distributed device message from an internet development board among a plurality of internet development boards communicatively coupled to the Wi-Fi compatible IoT sensor;
   decrypting any encrypted data associated with the distributed device message; and
   parsing the core message content within the distributed device message.

4. The computer-implemented method of claim 1, wherein the distributed device message is a wireless message and the source device is a low-power wide-area network (LPWAN) compatible IoT sensor or device interface, and wherein deriving the core message content comprises:
   receiving an LPWAN API call incorporating the distributed device message from an LPWAN routing device among a plurality of LPWAN routing devices communicatively coupled to the LPWAN compatible IoT sensor or device interface;
   decrypting any encrypted data associated with the distributed device message; and
   parsing the core message content within the distributed device message.

5. The computer-implemented method of claim 1, wherein the distributed device message is a wireless message and the source device is a short-range wireless compatible IoT sensor or device interface, and wherein deriving the core message content comprises:
- receiving the distributed device message from the short-range wireless compatible IoT sensor or device interface via a short-range wireless protocol;
- decrypting any encrypted data associated with the distributed device message; and
- parsing the core message content within the distributed device message.

6. The computer-implemented method of claim 1, further comprising:
- adapting the open standard file format message response to a distributed message response for relay to the source device.

7. The computer-implemented of claim 6, wherein adapting the open standard file format message response to the distributed message response comprises:
- decrypting any encrypted data associated with the open standard file format message response;
- parsing core message response content within the open standard file format message response; and
- converting the core message response content to source device format.

8. The computer-implemented method of claim 1, further comprising:
- receiving at least one over-the-air (OTA) firmware or configuration update.

9. The computer-implemented method of claim 1, wherein, responsive to a failure affecting a Wi-Fi router in a Wi-Fi router network via which the system-on-a-chip microcontroller is connected to the virtualized management system, the system-on-a-chip microcontroller is configured to automatically connect to another Wi-Fi router in the Wi-Fi router network for which connectivity credentials are stored.

10. The computer-implemented method of claim 1, wherein the system-on-a-chip microcontroller is configured to convert the derived core message content to one or more of a plurality of supported open standard file formats.

11. The computer-implemented method of claim 1, wherein the system-on-a-chip microcontroller is battery operable.

12. The computer-implemented method of claim 1, wherein the open standard file format message content is propagated via a representational state transfer (REST) API.

13. The computer-implemented method of claim 1, wherein the open standard file format message content is propagated via a Message Queuing Telemetry Transport (MQTT) broker.

14. The computer-implemented method of claim 1, wherein the open standard file format message content is propagated via a software bus implementation using stream-processing.

15. A computer program product comprising a computer readable storage medium having program instructions embodied therewith, wherein the program instructions are executable by at least one processor core in a system-on-a-chip microcontroller of a universal interface apparatus, wherein the universal interface apparatus is configured to automatically facilitate device discovery within a computing infrastructure, and wherein the program instructions cause the at least one processor core to:
- derive, via the system-on-a-chip microcontroller of the universal interface apparatus, core message content from a distributed device message received from, and transmitted via a first type of hardware interface of a source device, wherein deriving the core message content from the distributed device message includes:
  - parsing the distributed device message to separate the core message content from source device hardware interface specific message content of the first type of hardware interface, wherein the core message content is message content from the distributed device message that is associated with virtual management system processing, exclusive of the hardware interface specific message content of the first type of hardware interface, to be converted to an open standard file format;
- convert the derived core message content to open standard file format message content;
- propagate, via the system-on-a-chip microcontroller of the universal interface apparatus, the open standard file format message content to the virtualized management system via a second, different type of hardware interface than the first type of hardware interface of the source device; and
- receive, by the system-on-a-chip microcontroller of the universal interface apparatus, an open standard file format message response from the virtualized management system.

16. The computer program product of claim 15, wherein the program instructions further cause the at least one processor core to:
- adapt the open standard file format message response to a distributed message response for relay to the source device.

17. A universal interface apparatus configured to automatically facilitate device discovery within a computing infrastructure, the universal interface apparatus comprising:
- a system-on-a-chip microcontroller configured to:
  - derive core message content from a distributed device message received from, and transmitted via a first type of hardware interface of a source device, wherein deriving the core message content from the distributed device message includes:
    - parsing the distributed device message to separate the core message content from hardware interface specific message content of the first type of hardware interface, wherein the core message content is message content from the distributed device message that is associated with virtual management system processing, exclusive of the hardware interface specific message content of the first type of hardware interface, to be converted to an open standard file format;
  - convert the derived core message content to open standard file format message content;
  - propagate the open standard file format message content to the virtualized management system via a second, different type of hardware interface than the first type of hardware interface of the source device; and
  - receive an open standard file format message response from the virtualized management system; and
- a plurality of serial interface adapter boards configured to convert any serial aspect of the distributed device message to TTL format to facilitate derivation of the core message content.

18. The universal interface apparatus of claim 17, wherein the plurality of serial interface adapter boards comprise:
- a D-subminiature connector variety to RS-232 adapter board configured to convert a D-subminiature connector variety format associated with the distributed device message to RS-232 format; and an RS-232 to TTL adapter board configured to convert the RS-232 format to the TTL format.

19. The universal interface apparatus of claim 18, wherein the D-subminiature connector variety to RS-232 adapter board is a DB-25 to RS-232 adapter board.

20. The universal interface apparatus of claim 18, wherein the D-subminiature connector variety to RS-232 adapter board is a DB-9 to RS-232 adapter board.

* * * * *